US010558646B2

(12) United States Patent
Epstein et al.

(10) Patent No.: US 10,558,646 B2
(45) Date of Patent: Feb. 11, 2020

(54) COGNITIVE DEDUPLICATION-AWARE DATA PLACEMENT IN LARGE SCALE STORAGE SYSTEMS

(71) Applicant: International Business Machines Corporation, Armonk, NY (US)

(72) Inventors: Amir Epstein, Herzelia (IL); Danny Harnik, Tel Mond (IL); Ronen Itshak Kat, Kokav-Yair (IL)

(73) Assignee: International Business Machines Corporation, Armonk, NY (US)

(*) Notice: Subject to any disclaimer, the term of this patent is extended or adjusted under 35 U.S.C. 154(b) by 333 days.

(21) Appl. No.: 15/582,703

(22) Filed: Apr. 30, 2017

(65) Prior Publication Data
US 2018/0314727 A1 Nov. 1, 2018

(51) Int. Cl.
*G06F 16/23* (2019.01)
*G06N 20/00* (2019.01)

(52) U.S. Cl.
CPC ......... *G06F 16/2365* (2019.01); *G06N 20/00* (2019.01)

(58) Field of Classification Search
CPC ........... G06F 16/2456; G06F 16/24545; G06F 16/58; G06F 16/355; G06F 16/40
See application file for complete search history.

(56) References Cited

U.S. PATENT DOCUMENTS

| | | | |
|---|---|---|---|
| 6,842,751 B1 * | 1/2005 | Vilalta | |
| 7,987,144 B1 * | 7/2011 | Drissi | G06N 20/00 706/20 |
| 8,140,491 B2 * | 3/2012 | Mandagere | G06F 16/24556 707/692 |
| 8,838,510 B2 * | 9/2014 | Baughman | G06N 3/126 706/13 |
| 8,856,050 B2 * | 10/2014 | Chenthamarakshan | G06N 20/00 706/12 |
| 9,246,996 B1 * | 1/2016 | Brooker | H04L 67/1008 |
| 9,280,551 B2 * | 3/2016 | Chambliss | G06F 16/1748 |
| 9,298,386 B2 * | 3/2016 | Baldwin | G06F 3/0641 |

(Continued)

FOREIGN PATENT DOCUMENTS

WO 2016105241 6/2016

OTHER PUBLICATIONS

Wildani et al., "HANDS: A Heuristically Arranged Non-Backup In-line Deduplication System", IEEE 29th International Conference on Data Engineering (ICDE), Apr. 8-12, 2013, pp. 446-457.

(Continued)

*Primary Examiner* — Daniel A Kuddus
(74) *Attorney, Agent, or Firm* — Gregory J. Kirsch (57) ABSTRACT

A method for a data placement that attempts to predict the most suitable placement, in terms of data reduction, of a newly created storage volume based on the volumes known attributes and the current placement of volumes to deduplication domains is disclosed. The system uses machine learning to perform improved deduplication-aware placement. The system attempts to predict the deduplication domain where a newly created volume would eventually have the best content sharing. The system does this by using the known attributes of the volume at the time of creation, such as owner, volume name, initial size, creation time, and the history of data already in the system and its placement.

20 Claims, 4 Drawing Sheets

(56) References Cited

U.S. PATENT DOCUMENTS

| | | | | |
|---|---|---|---|---|
| 9,348,538 | B2* | 5/2016 | Mallaiah | G06F 3/0608 |
| 9,984,386 | B1* | 5/2018 | Bhatia | G06Q 30/01 |
| 2010/0250501 | A1* | 9/2010 | Mandagere | G06F 16/24556 |
| | | | | 707/692 |
| 2012/0185415 | A1* | 7/2012 | Chenthamarakshan | |
| | | | | G06N 20/00 |
| | | | | 706/12 |
| 2013/0073490 | A1* | 3/2013 | Baughman | G06N 3/126 |
| | | | | 706/13 |
| 2014/0279739 | A1* | 9/2014 | Elkington | G06N 20/00 |
| | | | | 706/12 |
| 2015/0278241 | A1* | 10/2015 | Bates-Haus | G06F 16/215 |
| | | | | 707/692 |
| 2016/0105241 | A1* | 4/2016 | Keil | G02B 6/4272 |
| | | | | 250/553 |
| 2018/0114001 | A1* | 4/2018 | Jain | G06F 21/31 |
| 2018/0114099 | A1* | 4/2018 | Desai | G06K 9/6259 |
| 2019/0121889 | A1* | 4/2019 | Gold | G06F 16/2255 |

OTHER PUBLICATIONS

Xu et al., "Even Data Placement for Load Balance in Reliable Distributed Deduplication Storage Systems", IEEE 23rd International Symposium on Quality of Service (IWQoS), Jun. 15-16, 2015, pp. 349-358.

* cited by examiner

COGNITIVE DEDUPLICATION-AWARE DATA PLACEMENT IN LARGE SCALE STORAGE SYSTEMS

FIELD OF TECHNOLOGY

The present invention relates to the technical field of data storage. In particular, the present invention relates to deduplication-aware data placement in a data storage environment.

BACKGROUND OF THE INVENTION

Data reduction methods such as compression and deduplication are commonly used in storage systems to reduce the required storage capacity and thus storage cost. Data compression captures "local" scope such as at the block or file level, while deduplication considers a "global" scope. Deduplication enables reducing storage capacity by storing only one copy of duplicated data written to a storage system. In distributed storage systems, different clients will often store the same data. By removing duplicate content, the storage system can improve efficiency in terms of storage space.

However, storage environments in large scale systems are often composed of a set of deduplication domains, where each domain manages its own data independently from other systems (and specifically handles deduplication internally). In many such environments, the storage management layer that allocates data entities, such as storage volumes, does not take into account the content sharing among volumes when assigning new volumes to deduplication domains. Thus, content sharing across these domains is not exploited, which can result in significant deduplication loss. Even when the management layer considers content sharing among volumes in these environments, there is often no knowledge of the future content that would be written to it when creating a volume. Thus, content sharing is not exploited.

SUMMARY OF INVENTION

The present invention, in embodiments, comprises a method for a novel data placement approach that attempts to predict the most suitable placement, in terms of data reduction, of a newly created storage volume based on the volumes known attributes and the current placement of volumes to deduplication domains and characteristics of volumes in the system.

In embodiments, the system uses machine learning to perform improved deduplication-aware placement. The system attempts to predict the deduplication domain where a newly created volume would eventually have the best content sharing. The system does this by using the known attributes of the volume at the time of creation (e.g., owner, volume name, initial size, creation time) and the history of data already in the system and its placement.

The system, in certain embodiments, is able to overcome the challenge of having no knowledge on the future content of a volume during its initial placement. Predicting the best placement for a new volume has the following key benefits: (i) reducing the overall physical storage capacity of the system and (ii) avoiding the need for future expensive data migrations of volumes that were not well placed.

In embodiments, a method for deduplication comprises receiving a set of volume attributes for existing volumes stored in existing deduplication domains, calculating a set of input feature vectors for each volume attribute in the set of volumes attributes, calculating capacity statistics for each volume in the set of volumes by considering all possible placements of the volume to deduplication domains, wherein capacity statistics comprise an estimate of the physical size in each domain, generating target variables for each volume based on the capacity statistics, running a supervised learning algorithm to train a model for predicting the deduplication domain where a newly created volume would eventually have the best content sharing according to its input feature vector, thus generating a recommended placement for a newly created volume, which can be used for placing the newly created volume.

In an optional embodiment, generating a recommended placement comprises generating a label of a best domain for placement. In another optional embodiment, generating a recommended placement comprises generating a score for each dedupe domain.

In a preferred embodiment, generating target variables comprises calculating how much physical capacity each volume will require in each dedupe domain. In a further preferred embodiment, generating target variables comprises estimating in which dedupe domain each volume requires a least capacity and labeling the volume with the class representing this dedupe domain.

In an optional embodiment generating target variables comprises estimating a class of each volume by representing the best dedupe domain. In a further optional embodiment, generating target variables comprises calculating a score according to physical capacity for each dedupe domain. In a preferred embodiment, the capacity statistics comprise a physical size in each domain.

In an optional embodiment, the set of volume attributes comprise a volume owner and volume name. In another optional embodiment, the set of volume attributes comprise an initial size, a creation time, and/or a creation time. In further optional embodiments, the supervised learning algorithm comprises a support vector machine (SVM) or decision tree.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
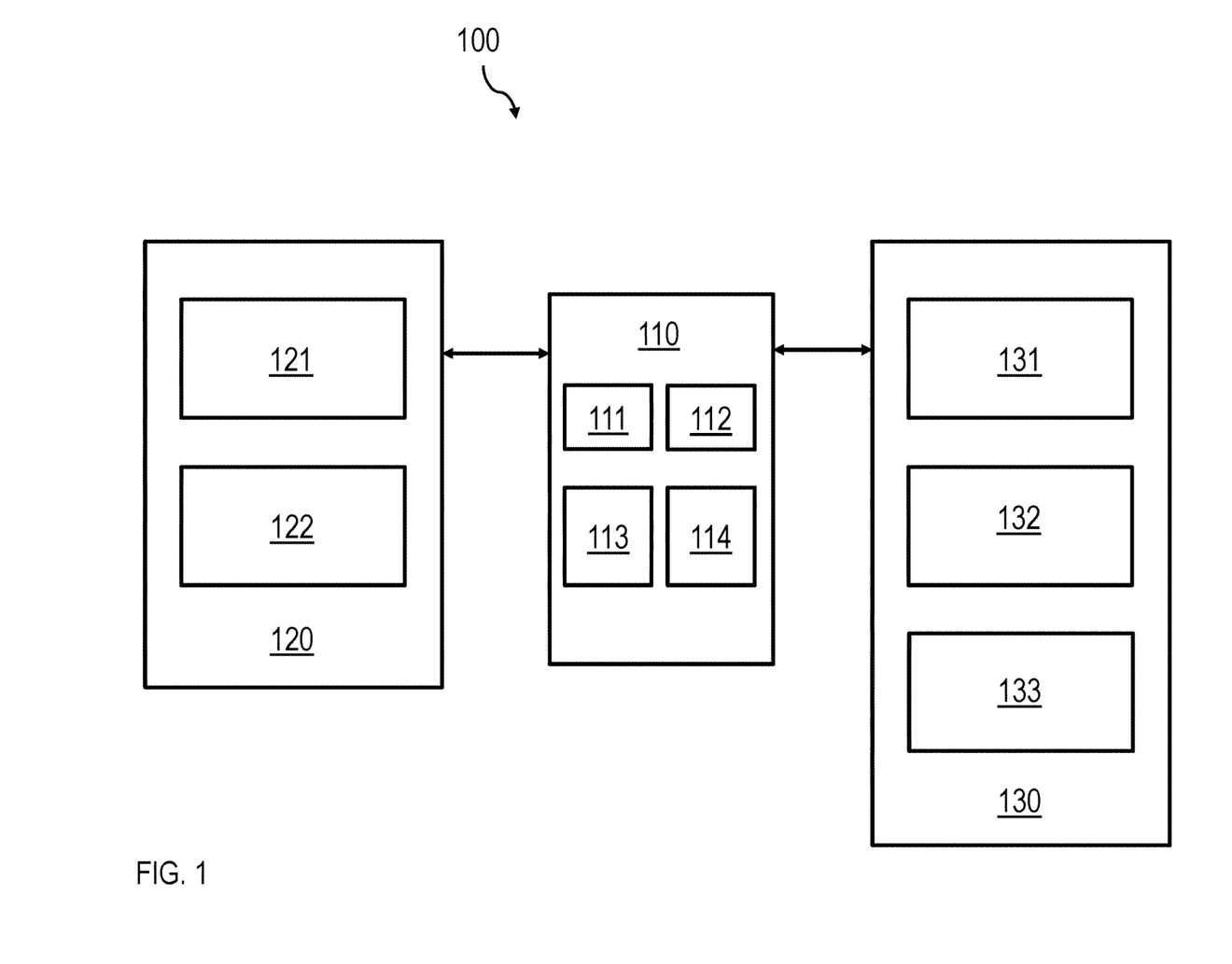
FIG. 1 illustrates a deduplication system using cognitive deduplication-aware data placement, according to an embodiment of the present invention.

FIG. 1 illustrates a deduplication system 100 using cognitive deduplication-aware data placement, according to an embodiment of the present invention. A deduplication controller 110 is attached to a first storage domain 120 and a second storage domain 130. The controller can comprise a processor 111 and a memory 112. The memory can contain software that is executed by the processor. The controller can contain the training component 113 and the placement engine component 114. The training component and the placement engine component may be implemented in hardware or software. This software may be stored in the memory 112 and executed by the processor 111. The first storage domain contains a first storage volume 121 and a second storage volume 122. The second storage domain likewise contains a third storage volume 131, a fourth storage volume 132, and a fifth storage volume 133. The storage controller 110 determines the data placement by using the cognitive deduplication-aware processes.

The present invention, in embodiments, uses storage volumes placed in a storage environment with multiple deduplication domains. However, this arrangement can be generalized to various storage data entities other than volumes, including objects, containers, files, directories and pools, etc. Each new volume can be characterized by a vector of attributes, including owner, volume name, initial size, creation time. Volumes already stored in the system may have additional attributes, including the deduplication domain where the volume is stored, its logical size (size of data including duplicates), and the actual physical size in each domain (i.e., not including duplicated chunks with other collocated volumes) and its usage and performance parameters (e.g., read/write history, age).

Embodiments of the system and the processes it performs can predict the most suitable data placement for new volume requests using machine learning classification algorithms that predict and identify the deduplication domain with the highest potential content sharing with the newly created volume.

For example, volumes of the same user, similar initial size and similar volume name (e.g., the volume name of VM images containing the same application or replicas of a database may have the same prefix and, initial size and/or content) may have large amount of shared data. Alternatively, in some cases the deduplication will only be across users. A goal of the system may be to learn rules that are best for a specific deployment, with a specific current system state.

The system, in embodiments, includes a training component 113 and placement engine component 114. The training component 113 considers volumes after they have incurred a decent amount of data and essentially "replays" their placement. Given a system state, and the knowledge of the data in the existing volumes, the feature vector for each volume in the system is calculated. When the volume data is already known, one can estimate the physical size that the volume would require in each deduplication domain. The best placement requires the minimal physical size.

The training component 113 runs a machine learning algorithm for supervised learning (e.g., decision trees or support vector machines). Each volume in the training set is given a label consisting of the best deduplication domain for the specific volume. Alternatively, each volume can get a score for its potential capacity savings in each of the deduplication domains. The training algorithm creates a model for predicting the recommended placement for new volumes according to their feature vectors.

Note that the placement engine 114 can take into account additional properties such as the load of the deduplication domains when making the placement decision, since often the optimization problem is multi-objective.

In one embodiment, the following training process is used to learn the classification model from the data that includes the set of volumes that are already stored in the system and the placement of volumes to domains.

Each volume has a set of static attributes that are known before assigning the volume to domain (e.g., owner, volume name, creation time, initial size). The feature vector of a volume is calculated from these attributes. In addition, each volume has additional set of (dynamic) attributes that becomes known after the volume is stored (and accumulates sufficient amount of data) in the system (e.g., the domain where it is stored, logical size, physical size in its domain, sketch of the volume).

The training set contains all volumes that are stored in the system.

Let n, m be the number of volumes and number of domains in the system, respectively.

In the first phase the feature vector of each volume i in the system denoted by $x_i=(x_{i1}, \ldots, x_{ik})$ is calculated.

In this phase, domain specific knowledge is used for feature processing.

The most significant attribute for feature extraction is volume name. The volume name is translated into a set of domain features using natural language processing (NLP) methods implemented by the NLP (like) component. For example, the system can perform the following steps for calculating the set of features of volume names. First, the system, in an aspect, constructs a dictionary and lexicons for the terms appearing in volume names as shown in the process 300 in FIG. 3 and described as follows.

Figure 3:
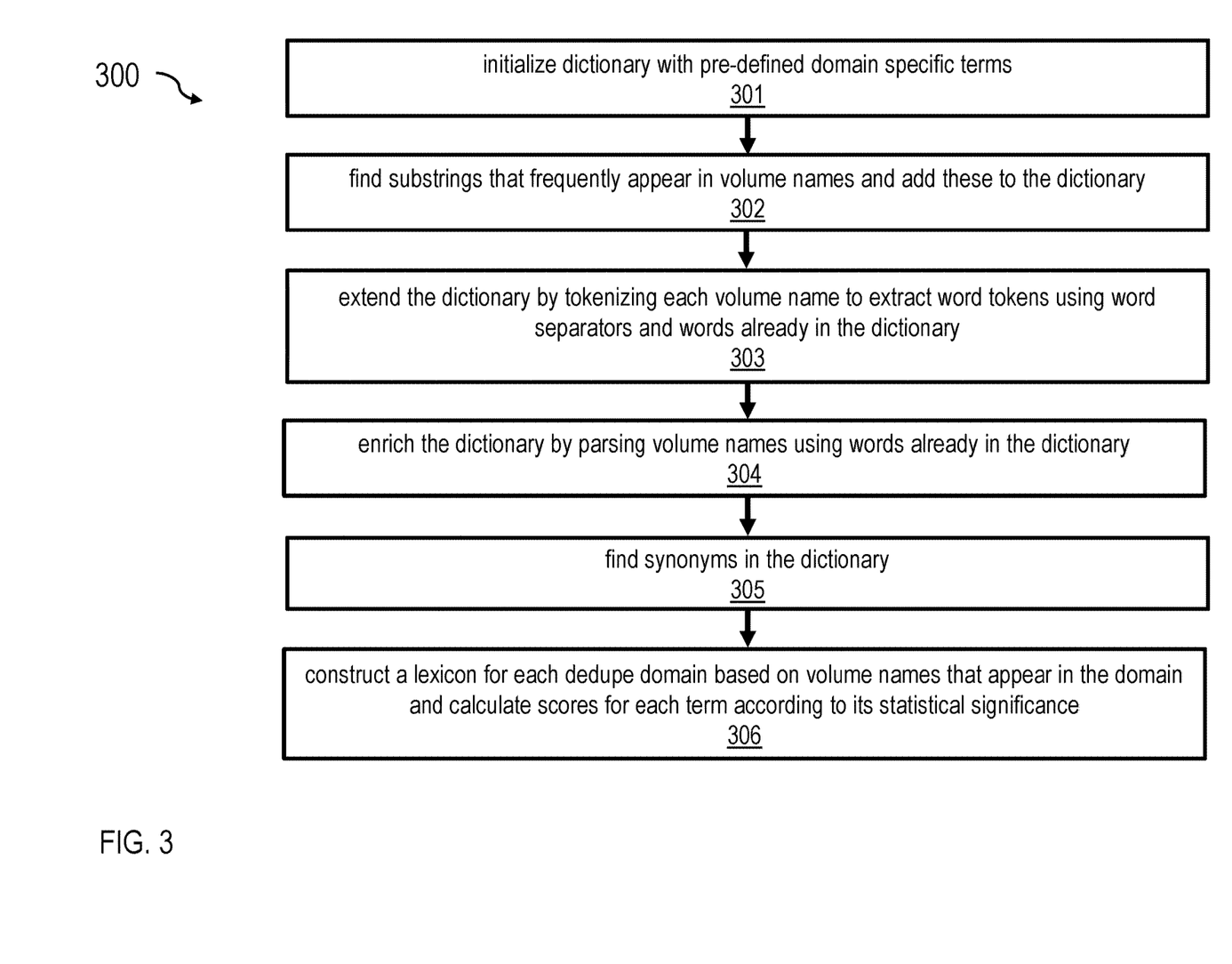
FIG. 3 illustrates the construction of a dictionary and lexicons for the terms appearing in volume names, according to an embodiment.

In step 301, the system initializes dictionary with pre-defined domain specific terms. These terms can be extracted from external resources such as Wikipedia. For example, a VM image name may include OS type, desktop or server applications, database, etc.

In step 302, the system finds substrings that frequently appear in volume names and add these to the dictionary.

In step 303, the system extends the dictionary by tokenizing each volume name to extract word tokens using word separators and words already in the dictionary.

In step 304, the system enriches dictionary by parsing volume names using words already in the dictionary.

In step 305, the system finds synonyms in the dictionary. This step may use external resources, such as a Wikipedia redirect.

In step 301, the system constructs a lexicon for each dedupe domain based on volume names that appear in the domain and calculate scores for each term according to its statistical significance.

Figure 4:
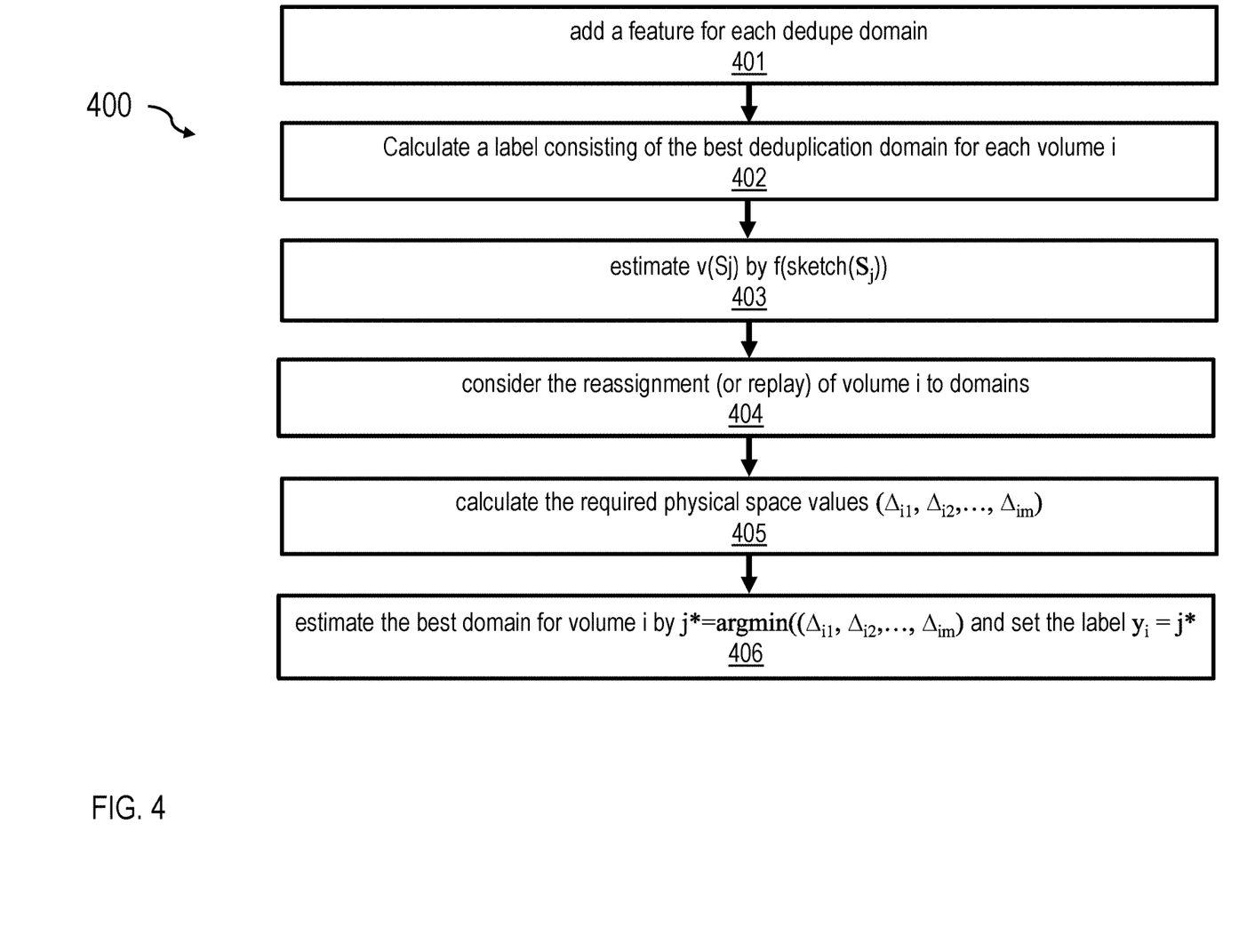
FIG. 4 illustrates the calculation of a feature vector for each volume name, according to an embodiment.

After building the dictionary and lexicon, a feature vector can be calculated for each volume name as shown in the embodiment of a process 400 in FIG. 4 and described as follows.

Calculate binary vector representing the words (including synonyms) in the dictionary that appear in its name.

In step 401, the system adds a feature for each dedupe domain, representing the lexical similarity between volume name and volume names in the domain. The lexicon of each domain can be used to calculate aggregate scores for the terms appearing in volume name.

Additional important attribute for feature extraction is date and time of volume creation from which features representing domain specific time characteristics are created. e.g., part of day, day of week, week of month.

In the next phase (labeling), a label consisting of the best deduplication domain for each volume i is calculated, as shown in step 402. This label is calculated as follows.

Let $S_j$ be the set of volumes assigned to deduplication domain j.

The total physical space of the set of volumes $S_j$ (assigned to domain j) is denoted by $v(S_j)$. Since the data of the set of volume $S_j$ is already known, this value can be estimated. For example, this value can be estimated efficiently using the sketches of the set of volume $S_j$. Specifically, the union sketch of the volume sketches denoted by sketch $(S_j)$ is calculated first. Then, a function f that is given as input a sketch of a set of volumes and returns a good estimate for the total physical space of the set of volumes is used.

Thus, $v(S_j)$ can be estimated by $f(sketch(S_j))$ in step 403.

Now in step 404, the system considers the reassignment (or replay) of volume i to domains, i.e., removing volume i from its domain and estimating the required physical space for it in each domain.

Let $S_j'=S_j\setminus\{i\}$.

Let $S'=\{S_1', \ldots, S_m'\}$, i.e., the assignment of volumes to domains, excluding volume i.

Let $\Delta_{ij}=v(S_j'\cup\{i\})-v(S_j')$, i.e., the required physical space for placing volume i in domain j.

The required physical space values $(\Delta_{i1}, \Delta_{i2}, \ldots, \Delta_{im})$ are calculated in step 405. Lower values represent higher capacity savings and can be used to give preferences to domains.

Then the best domain for volume i by $j^*=\mathrm{argmin}((\Delta_{i1}, \Delta_{i2}, \ldots, \Delta_{im})$ is estimated and the label $y_i=j^*$ is set in step 406.

Now each volume i has a set of attributes and a class $<x_i,y_i>$. Thus, the system has the complete set of "examples" that can be given as input to the learning algorithm.

Finally, the learning algorithm (e.g., SVM or decision trees) is ran on the training set to create a target function h (the model) for predicting the recommended placement of each new volume according to its feature vector. Specifically, given a feature vector x of a volume, h(x) predicts the recommended placement (i.e., dedupe domain) for this volume.

Note that it is assumed that the function h is a scalar function. However, it can also be a vector function, where each component represents a probability or a score for the corresponding dedupe domain.

When the system receives a placement request for a new volume it uses the model h for its placement decision as follows. The placement component first calculates the feature vector x of the volume according to its set of attributes. Then, it calculates h(x) for predicting the recommended placement for the new volume. Finally, the placement component makes a placement decision by taking into account the recommended placement (for minimizing the physical capacity) as well as other criteria such as the storage and I/O load of deduplication domains.

Figure 2:
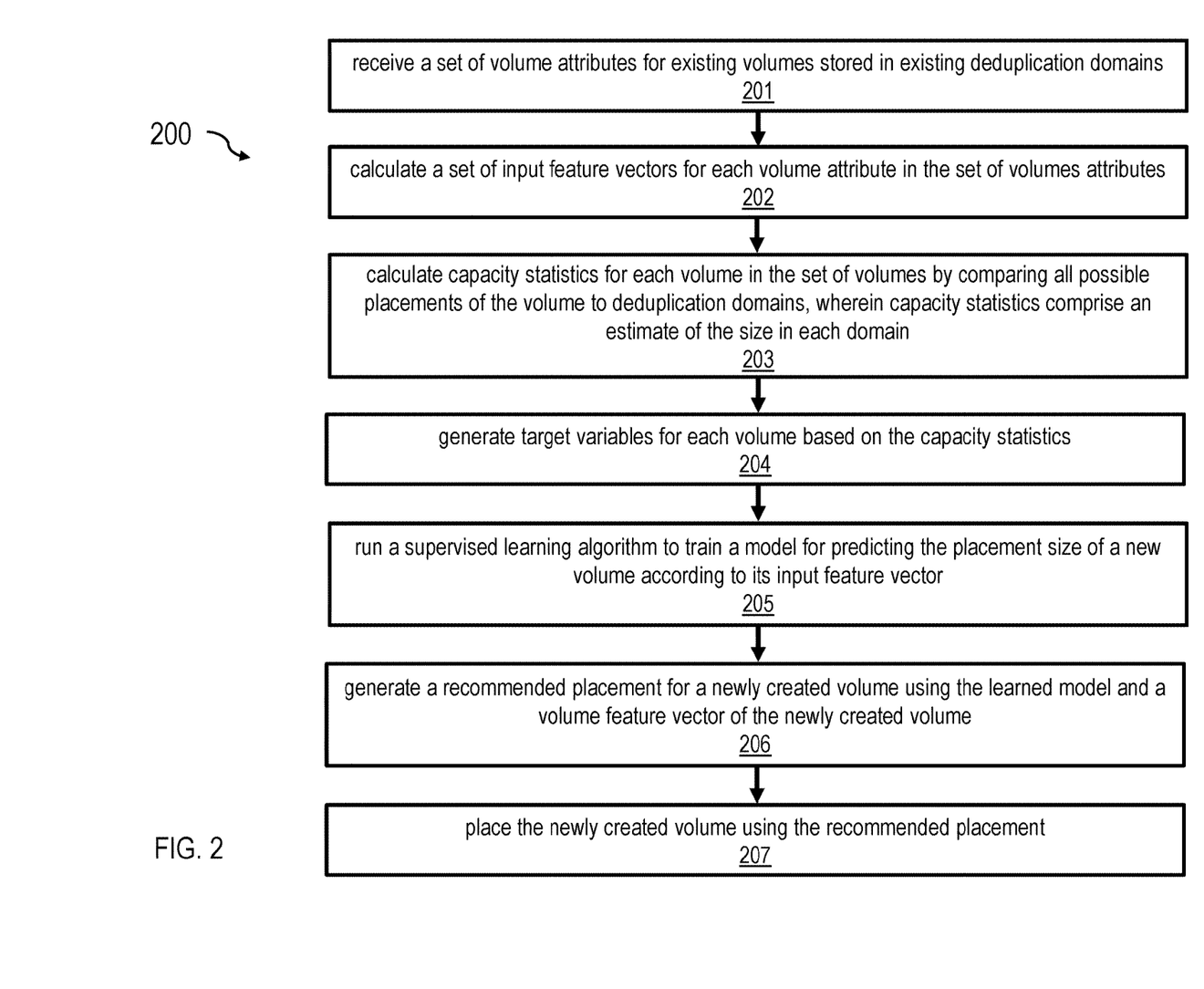
FIG. 2 illustrates a flow chart of the process for volume placement, according to an embodiment of the invention.

The process for volume placement in accordance with an embodiment of the invention is summarized in the flow chart 200 in FIG. 2. In step 201, the system receives a set of volume attributes for existing volumes stored in existing deduplication domains. In step 202, the system calculates a set of input feature vectors for each volume from its set of attributes. In step 203, the system calculates capacity statistics for each volume in the set of volumes by considering all possible placements of the volume to deduplication domains, where capacity statistics comprise an estimate of the physical size of the volume in each domain. In step 204, the system generates target variables for each volume based on the capacity statistics. In step 205, the system runs a supervised learning algorithm to train a model for predicting the most suitable placement (with the highest content sharing) of a new volume according to its input feature vector. In step 206, the system generates a recommended placement for a newly created volume using the learned model and a volume feature vector of the newly created volume. In step 207, the system places the newly created volume using the recommended placement.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method for deduplication of data stored in a computer system, the method implemented in the computer system comprising a processor, memory accessible by the processor, computer program instructions stored in the memory and executable by the processor, and data stored in the memory and accessible by the processor, the method comprising:
receiving, at the computer system, a volume comprising at least one volume attribute;
generating, at the computer system, a feature vector associated with the volume based on the at least one volume attribute, wherein the feature vector is generated by adding a feature to the feature vector for each of a plurality of deduplication domains, representing a lexical similarity between a name of the volume and volume names in each of the plurality of deduplication domains, determining capacity savings for removing the volume from each of the plurality of deduplication domains, and estimating a deduplication domain having a greatest capacity savings from among the plurality of deduplication domains; and
generating, at the computer system, a recommended placement for the volume into existing deduplication domains using a trained model receiving the feature vector;
wherein the trained model is trained, at the computer system, using a supervised learning algorithm that uses a set of input feature vectors and target variables, wherein the set of input feature vectors are generated, at the computer system, based on a set of existing volume attributes for existing volumes stored in the existing deduplication domains, and wherein the target variables are generated, at the computer system, based on capacity statistics comprise an estimate of physical size in each of the deduplication domains.

2. The method of claim 1, wherein the set of existing volume attributes comprises a volume owner.

3. The method of claim 1, wherein the set of existing volume attributes comprises a volume name.

4. The method of claim 3, wherein the set of input feature vectors is derived from the volume name by using natural language processing.

5. The method of claim 1, wherein the set of existing volume attributes comprises an initial size.

6. The method of claim 1, wherein the set of existing volume attributes comprises a creation time.

7. The method of claim 1, wherein the capacity statistics are calculated based on a physical capacity each of the existing volumes would have consumed in each of the deduplication domains.

8. The method of claim 1, wherein generating target variables comprises calculating a score according to the physical capacity in each deduplication domain in the deduplication domains.

9. The method of claim 1, wherein generating target variables comprises calculating a label representing the deduplication domain in the deduplication domains in which each volume in the existing volumes requires the least physical capacity.

10. The method of claim 1, wherein generating a recommended placement comprises generating a label of a best domain for placement.

11. The method of claim 1, wherein generating a recommended placement comprises generating a score for each deduplication domain in the deduplication domains.

12. The method of claim 1, wherein the supervised learning algorithm comprises a support vector machine.

13. The method of claim 1, wherein the supervised learning algorithm comprises a decision tree.

14. The method of claim 1, further comprising:
calculating probabilities for each deduplication domain in the deduplication domains according to the scores and using the probabilities for placing the newly created volume.

15. A computer system for deduplication of data stored in the computer system comprising a processor, memory accessible by the processor, computer program instructions stored in the memory and executable by the processor, and data stored in the memory and accessible by the processor to implement:
at least two deduplication domains comprising a set of volumes, wherein the set of volumes comprise a set of volume attributes; and
a storage management component that manages the at least two deduplication domains and is configured to:
receive a new volume attribute associated with a new volume;
generate a new feature vector based on the new volume attributes, wherein the feature vector is generated by adding a feature to the feature vector for each of a plurality of deduplication domains, representing a lexical similarity between a name of the volume and volume names in each of the plurality of deduplication domains, determining capacity savings for removing the volume from each of the plurality of deduplication domains, and estimating a deduplication domain having a greatest capacity savings from among the plurality of deduplication domains; and
apply a model to the new feature vector to generate a recommended placement for the new volume;
wherein the model uses a supervised learning algorithm that is trained using target variables and a set of input feature vectors by
receiving the set of volume attributes,
calculating the set of input feature vectors for each volume attribute in the set of volumes attributes,
calculating capacity statistics for each volume in the set of volumes by considering all possible placements of each volume in the set of volumes to every deduplication domain in the at least two deduplication domains, wherein capacity statistics comprise an estimate of physical size in each domain in the at least two deduplication domains, and
generating the target variables for each volume in the set of volumes based on the capacity statistics.

16. The system of claim 15, wherein the set of volume attributes comprises a volume name.

17. The system of claim 16, wherein the set of input feature vectors is derived from the volume name by using natural language processing.

18. The system of claim 15, wherein the supervised learning algorithm comprises a support vector machine.

19. The system of claim 15, wherein the supervised learning algorithm comprises a decision tree.

20. A computer program product comprising a non-transitory computer readable storage having program instructions embodied therewith, the program instructions executable by a computer, to cause the computer to perform a method for deduplication of data stored in the computer comprising:

receiving, at the computer, a new volume;

generating, at the computer, a new feature vector associated with the new volume based on at least one volume attribute of the new volume, wherein the feature vector is generated by adding a feature to the feature vector for each of a plurality of deduplication domains, representing a lexical similarity between a name of the volume and volume names in each of the plurality of deduplication domains, determining capacity savings for removing the volume from each of the plurality of deduplication domains, and estimating a deduplication domain having a greatest capacity savings from among the plurality of deduplication domains;

applying, at the computer, a model comprising target variables to the new feature vector to generate a recommended placement for the volume; and placing, at the computer, the new volume into existing deduplication domains based on the recommended placement;

wherein the model applies a supervised learning algorithm that:

receives, at the computer, a set of existing volume attributes for existing volumes stored in the existing deduplication domains, calculates, at the computer, a set of input feature vectors for each existing volume attribute in the set of volumes attributes, calculates, at the computer, capacity statistics for each existing volume in the existing volumes by considering all possible placements of each existing volume to the deduplication domains, wherein capacity statistics comprise an estimate of a physical size of each existing volume in each of the deduplication domains, generates, at the computer, target variables for each existing volume based on the capacity statistics, and trains, at the computer, the model using the target variables and the set of input feature vectors.

* * * * *